United States Patent
Takai (10) Patent No.: US 8,882,144 B2
(45) Date of Patent: Nov. 11, 2014

(54) KNEE COLLISION PROTECTION STRUCTURE FOR A VEHICLE

(71) Applicant: Mitsubishi Jidosha Kogyo Kabushiki Kaisha, Tokyo (JP)

(72) Inventor: Makoto Takai, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/072,477

(22) Filed: Nov. 5, 2013

(65) Prior Publication Data

US 2014/0125043 A1    May 8, 2014

(30) Foreign Application Priority Data

Nov. 6, 2012  (JP) ................................. 2012-244666

(51) Int. Cl.
  *B60R 21/045*    (2006.01)
  *B60R 21/00*     (2006.01)

(52) U.S. Cl.
  CPC ....... *B60R 21/045* (2013.01); *B60R 2021/0051* (2013.01)
  USPC ......... 280/752; 280/748; 280/751; 296/37.12

(58) Field of Classification Search
  CPC .................. B60R 21/206; B60R 2021/23169; B60R 2021/0051
  USPC ........... 280/752, 748, 751, 730.2, 736, 743.1, 280/732; 296/37.12
  See application file for complete search history.

(56) References Cited

U.S. PATENT DOCUMENTS

| | | | | |
|---|---|---|---|---|
| 5,071,162 A | * | 12/1991 | Takagawa | 280/752 |
| 5,482,319 A | * | 1/1996 | Yoshimura et al. | 280/752 |
| 6,299,208 B1 | * | 10/2001 | Kasahara et al. | 280/752 |
| 6,896,308 B2 | * | 5/2005 | Okanda et al. | 296/37.12 |
| 6,921,128 B2 | * | 7/2005 | Davis et al. | 296/193.02 |
| 7,311,327 B2 | | 12/2007 | Yamazaki | |
| 2004/0124623 A1 | | 7/2004 | Yamazaki | |
| 2004/0227371 A1 | * | 11/2004 | Okanda et al. | 296/37.12 |
| 2007/0182189 A1 | * | 8/2007 | Penner | 296/37.12 |
| 2011/0084512 A1 | * | 4/2011 | Taracko | 296/37.12 |

FOREIGN PATENT DOCUMENTS

JP    2004-203237 A    7/2004

\* cited by examiner

*Primary Examiner* — Paul N Dickson
*Assistant Examiner* — Darlene P Condra
(74) *Attorney, Agent, or Firm* — Birch, Stewart, Kolasch & Birch, LLP (57) ABSTRACT

A knee collision protection structure for a vehicle includes a glove box provided at a lower portion of an instrument panel and including a storage part and a panel part provided to stand on a cabin side of the storage part and configuring part of the instrument panel, and a shaft member provided on the vehicle front side than the panel part of the glove box and on the upper side than the storage part and extending in a vehicle widthwise direction. The glove box is provided so as to rotate around the shaft member when a knee of an occupant seated on a seat opposed to the glove box collides with a lower portion of the panel part than the shaft member.

12 Claims, 4 Drawing Sheets

KNEE COLLISION PROTECTION STRUCTURE FOR A VEHICLE

CROSS-REFERENCE TO THE RELATED APPLICATION

This application incorporates by references the subject matter of Application No. 2012-244666 filed in Japan on Nov. 6, 2012 on which a priority claim is based under 35 U.S.C. §119(a).

FIELD

The present invention relates to a knee collision protection structure for a vehicle for protecting the knees of an occupant of a vehicle upon head-on collision of the vehicle.

BACKGROUND

Conventionally, a collision protection structure is known wherein a shock absorbing member (knee absorber, knee protector or the like) is provided at a position opposed to the knees of an occupant of a vehicle on the front side of a driver's seat or a front passenger seat of the vehicle so that a knee load by secondary collision of the occupant is absorbed or reduced upon head-on collision of the vehicle thereby to protect the knees of the occupant. It is desirable to provide such a shock absorbing member for protecting the knees of the occupant at a position at which the shock absorbing member contacts with the knees of the occupant upon head-on collision of the vehicle. However, in a common vehicle, since an instrumental panel is provided on the front side of the occupant, the collision protection member may not necessarily be capable of being provided at the desired position. Particularly, since a glove box is disposed at a lower portion of the instrumental panel opposed to the front passenger seat, the constraint to the disposition position of the collision protection member is strong.

On the other hand, for example, Patent Document 1 (Japanese Patent Application Laid-Open Publication NO. 2004-203237) discloses an occupant protection apparatus wherein two supporting members extending in a forward and backward direction on the outer sides than the positions of the knees of an occupant of a vehicle in the vehicle widthwise direction are provided on the back face side of a panel on the compartment inner side of the glove box. With such a structure as just described, if a knee of the occupant collides with the panel upon head-on collision of the vehicle and the knee load is applied to the panel, then a central portion of the panel is deformed into a curved shape such that it projects forward of the vehicle. At this time, since the panel is deformed into a curved shape around fulcrums provided by the supporting members, the knee load acting upon the panel can be absorbed irrespective of the physique of the occupant to protect the knee of the occupant. Further, an insert panel for collision absorption is provided on the panel, and the knee load can be absorbed also by deformation of the insert panel for collision absorption.

However, in the technology disclosed in Patent Document 1 described above, since the knee load is absorbed by deformation of the panel (including the insert panel) of the glove box, there is a possibility that the displacement amount of the knee of the occupant in the forward and backward direction may increase.

SUMMARY

Technical Field

The present invention has been made in view of such a subject as described above, and it is an object of the present invention to provide a knee collision protection structure for a vehicle with which the displacement amount of a knee in the forward and backward direction can be reduced irrespective of the physique of an occupant to suitably protect the knee of the occupant upon head-on collision of the vehicle.

It is to be noted that, in addition to the object described above, also it shall be understood as an object of the present invention to achieve such effects as are provided by the constitutions of a mode for carrying out the invention hereinafter described but are not provided by the conventional technologies.

Solution to Problems (1) A knee collision protection structure for a vehicle disclosed herein includes a glove box provided at a lower portion of an instrument panel and including a storage part and a panel part provided to stand on a cabin side of the storage part and configuring part of the instrument panel, and a shaft member provided on the vehicle front side than the panel part of the glove box and on the upper side than the storage part and extending in a vehicle widthwise direction. The glove box is provided so as to rotate around the shaft member when a knee of an occupant seated on a seat opposed to the glove box collides with a lower portion of the panel part than the shaft member. In other words, upon head-on collision of the vehicle, the glove box rotates around the shaft member when a knee load by secondary collision of an occupant of the vehicle acts on a lower portion of the panel part than the shaft member.

(2) Preferably, the knee collision protection structure for a vehicle further includes a deck cross pipe provided on the vehicle front side than the instrument panel and extending in the vehicle widthwise direction, and a pair of left and right knee protectors disposed above the storage part and each having one end portion connected to the deck cross pipe and the other end portion provided on the vehicle rear side than the one end portion. At this time, preferably the shaft member is a connecting shaft that connects the other end portions of the pair of left and right knee protectors to each other.

(3) Preferably, the glove box is provided as a separate member from the instrument panel and fixed to a lower portion of the instrument panel.

(4) Preferably, the glove box is configured from a combination of a lower part including the storage part and the panel part and an upper part including a frame body in which the lower part is rotatably fitted. Further preferably, the upper part has a pivot shaft provided at a bottom portion of the frame body and extending in the vehicle widthwise direction, and the lower part is rotatably provided around the pivot shaft. It is to be noted that the pivot shaft is provided substantially in parallel to the shaft member and positioned on the lower side than the shaft member.

(5) At this time, preferably the upper part includes a grooved portion positioned on the upper side of the storage part in a state in which the upper part is combined with the lower part and formed in a concave shape toward the vehicle rear side. Further, in this instance, more preferably the shaft member is inserted in the grooved portion.

Advantageous Effects

With the knee collision protection structure for a vehicle of the present disclosure, if a knee of an occupant seated on the seat opposed to the glove box collides, upon head-on collision of the vehicle, with a lower portion of the panel part than the shaft member, then the glove box rotates around the shaft member. Therefore, where the occupant has a small physique and the position of the knees is low, the knee load can be reduced by rotation of the glove box. On the other hand, where the occupant has a great physique and the position of the knees is high, the knee load can be absorbed by crush of the glove box without rotation of the glove box. Consequently, upon head-on collision of the vehicle, the displacement amount of the knee in the forward and backward direction is reduced irrespective of the physique of an occupant seated on the seat opposed to the glove box and the knee of the occupant can be suitably protected.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 5(a) and 5(b) are views exemplifying an action upon head-on collision of the vehicle, wherein FIG. 5(a) depicts an action in a case in which the physique of an occupant is small and FIG. 5(b) depicts an action in another case in which the physique of an occupant is great.

DESCRIPTION OF EMBODIMENT

A knee collision protection structure for a vehicle is described with reference to the drawings. It is to be noted, however, that the embodiment described below is illustrative to the end, and there is no intention to eliminate various modifications and applications of the technology not explicitly specified in the embodiment described below. The configurations of the present embodiment can be carried out in various modified forms without departing from the scope of the present invention and can be selected as occasion demands or can be suitably combined. In the following description, the traveling direction of a vehicle and the opposite direction to the traveling direction are determined as forward and backward directions, respectively, and the left and right are determined with reference to the forward direction determined in this manner. Further, the direction of the gravity and the opposite direction to the gravity direction are determined as downward and upward directions, respectively. It is to be noted that, while a left steering wheel car is exemplified, a similar structure (symmetrical with respect to a plane) is applied also to a right steering wheel vehicle.

[1. General Structure]

Figure 1:
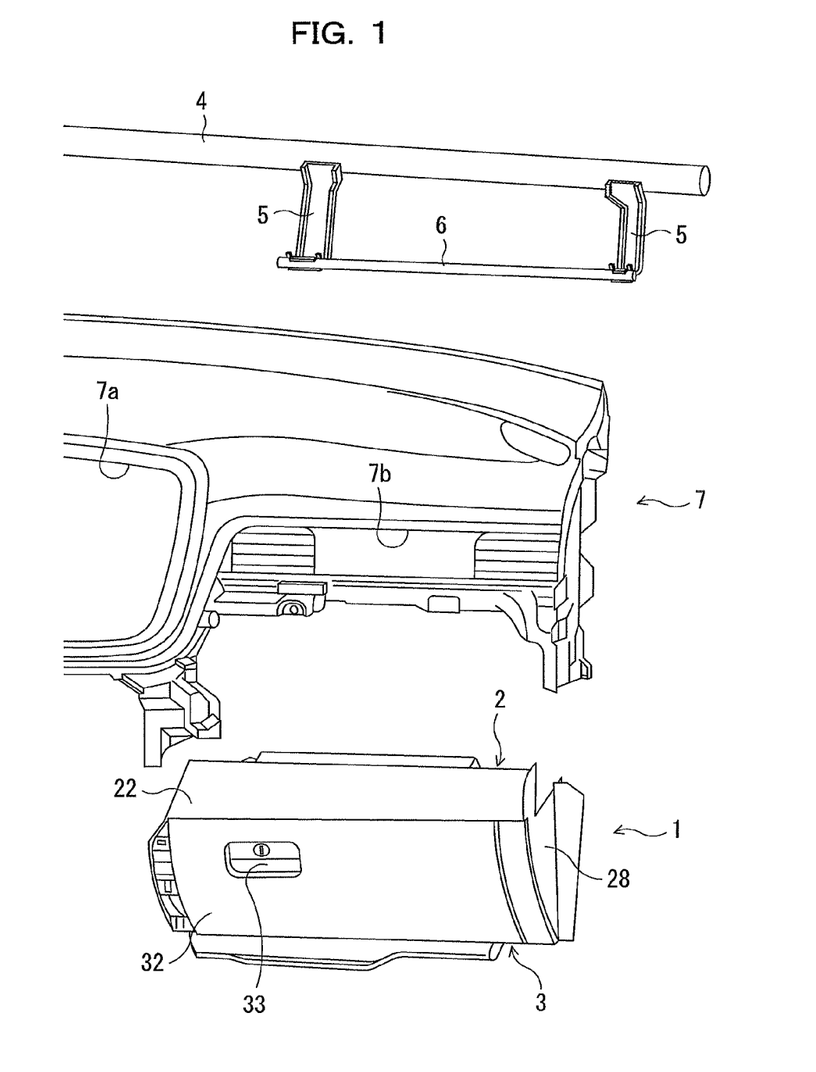
FIG. 1 is a perspective view, as viewed from the vehicle rear side, depicting a structure of a right side front portion of a vehicle body to which a knee collision protection structure for a vehicle according to an embodiment is applied.
Figure 2:
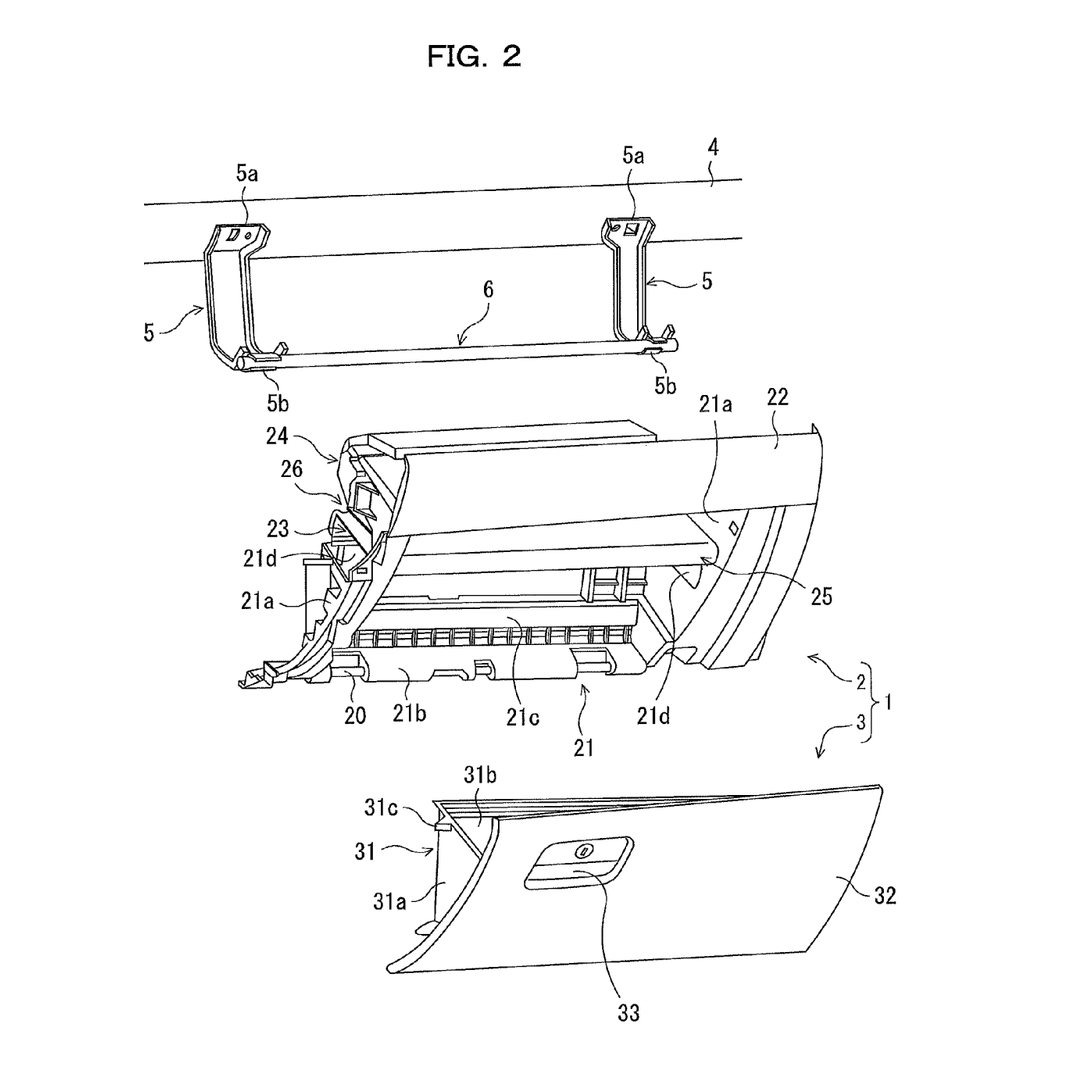
FIG. 2 is an exploded perspective view depicting the knee collision protection structure for a vehicle according to the embodiment.
Figure 3:
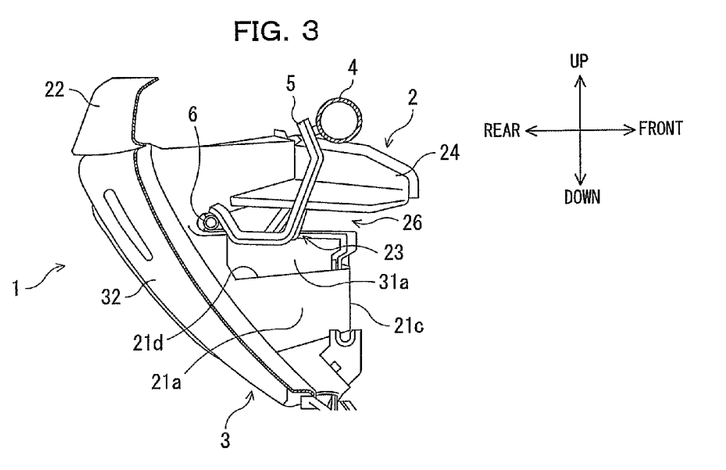
FIG. 3 is a sectional view of the knee collision protection structure for a vehicle according to the embodiment.
Figure 4:
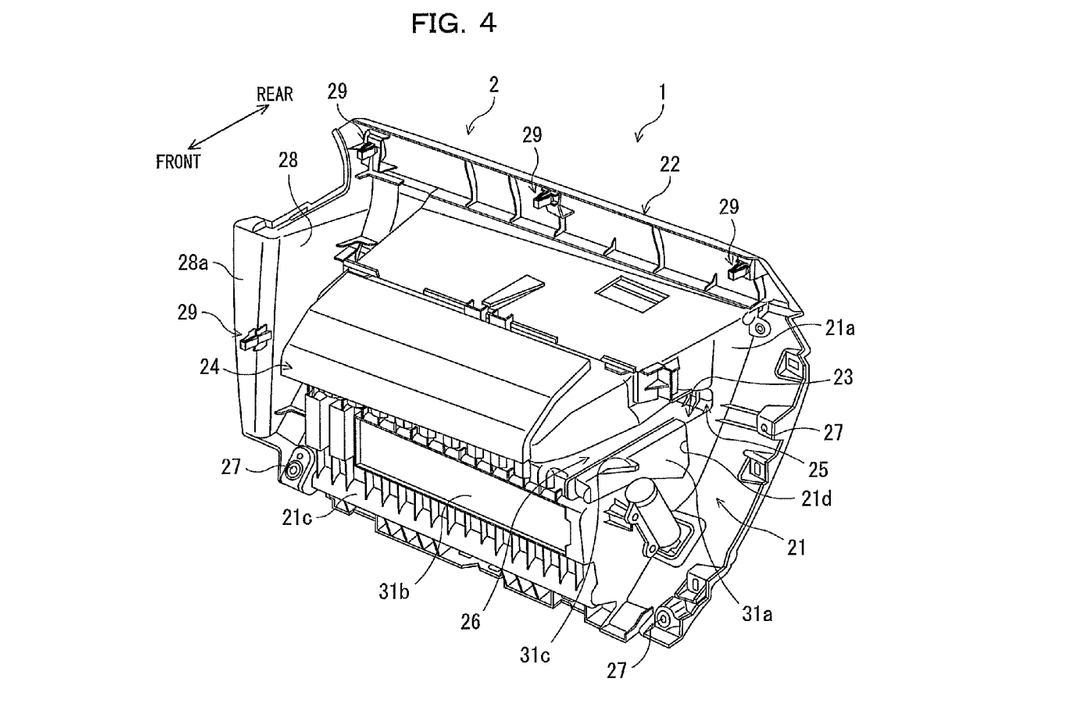
FIG. 4 is a perspective view, as viewed from the rear side, of a glove box used in the knee collision protection structure for a vehicle according to the embodiment.

FIG. 1 is a perspective view, as viewed from a vehicle backward direction, depicting a front structure on the right side of a vehicle body to which a knee collision protection structure for a vehicle according to the embodiment is applied. FIG. 2 is an exploded perspective view of the present knee collision protection structure. FIG. 3 is a sectional view of the present knee collision protection structure. FIG. 4 is a perspective view of a glove box used in the present knee collision protection structure as viewed from the rear side thereof (from the vehicle front side). It is to be noted that an instrument panel 7 is omitted in FIG. 3.

As depicted in FIG. 1, the instrument panel 7 is provided over the substantially overall vehicle width on the front face of a compartment of the vehicle. A hole 7a, a recess 7b and so forth are formed on the instrument panel 7. For example, an audio operation unit, an air conditioner operation unit and so forth not depicted are mounted in the hole 7a. Further, a glove box 1 is mounted in the recess 7b formed at a lower portion of the instrument panel 7 on the right side.

The glove box 1 is a storage mechanism provided on the front side of a front passenger seat. Here, the glove box 1 is configured by combining two parts of an upper part 2 fixed to the instrument panel 7 and a lower part 3 rotatably supported on the upper part 2 with each other as depicted in FIG. 2. The lower part 3 includes a first storage part (storage part) 31 of a shape of a box open upwardly and a lower panel part (panel part) 32 provided on the compartment side (vehicle rear side) of the first storage part 31 and configuring part of a face extending in the vehicle widthwise direction of the instrument panel 7.

The first storage part 31 has a storage space surrounded by two side face portions 31a provided to stand in a spaced and opposing relationship from and to each other, a rear face portion 31b provided to stand and connect between front end portions of the two side face portions 31a and a lower portion of the lower panel part 32. The side face portions 31a are formed in a substantially triangular shape as viewed in side elevation, and a projection 31c projecting outwardly is formed at an upper end portion of each face of the side face portions 31a on the outer side in the vehicle widthwise direction. Further, an engagement portion (not depicted) for engaging with a pivot shaft 20 hereinafter described is provided on the outer side of a lower end portion of the first storage part 31.

The lower panel part 32 is provided in an inclined relationship such that an upper portion thereof is positioned on the rear side than a lower portion. In other words, the lower panel part 32 is provided on the rear side of the first storage part 31 so as to have an upwardly rising inclined posture toward the vehicle rearward direction. Further, the lower panel part 32 extends to an upper location than an upper end portion of the first storage part 31. It is to be noted that a grip 33 for opening and closing the lower part 3 by operation of the occupant is provided on a face (rear face) of the lower panel part 32 opposed to the front passenger seat.

The upper part 2 includes a pivot shaft 20 used as a center shaft when the lower part 3 rotates with respect to the upper part 2, a frame body 21 with which the lower part 3 is rotatably fitted, an upper panel part 22 provided above the frame body 21 and configuring part of a face of the instrument panel 7 extending in the vehicle widthwise direction and a storage lid part 23 with which the lower part 3 is combined and which covers an opening at an upper portion of the first storage part 31 in a state in which the first storage part 31 is closed.

The frame body 21 includes two side portions 21a provided to stand in a spaced and opposed relationship from and to each other, a bottom portion 21b extending substantially horizontally between lower end portions of the two side portions 21a, and a rear portion 21c provided to stand on a vehicle front edge of the bottom portion 21b. An elongated hole 21d extending in the forward and backward direction is formed on each side portion 21a. The pivot shaft 20 extending in the vehicle widthwise direction is provided at an end portion of the bottom portion 21b on the compartment side. By engaging the engagement portion with the pivot shaft 20, the lower part 3 is rotatably supported on the upper part 2 such that an upper portion of the lower part 3 can be opened and closed in the forward and backward direction with respect to the lower end portion of the lower part 3.

The left side portion 21a has a rear end portion extending in an upward and downward direction and formed in a shape curved in a leftward direction while the right side portion 21a has a rear end portion extending in the upward and downward direction and formed in a shape curved in a rightward direction. The portions formed in a curved shape configure the same plane as the lower panel part 32 when the upper part 2 and the lower part 3 are combined with each other. It is to be noted that, as depicted in FIGS. 1 and 4, a right panel part 28 in the form of a flat plate spaced from the right side portion 21a and configuring part of the right side face of the instrument panel 7 is provided on the outer side of the right side portion 21a in the vehicle widthwise direction. The right panel part 28 is provided on the rear side of a right end portion of the upper panel part 22 such that a space is formed between the right side portion 21a of the frame body 21 and the right panel part 28. The right panel part 28 has a front end portion 28a formed in a curved shape to the outer side in the vehicle widthwise direction and extending in the upward and downward direction.

The first storage part 31 of the lower part 3 is fitted in the frame body 21 such that the projection 31c projects outwardly from the elongated hole 21d of the frame body 21. Consequently, the projection 31c is caught by the rear end portion of the elongated hole 21d when the lower part 3 is opened to stop the rotation of the lower part 3 in the forward and backward direction. In other words, the lower part 3 can slidably move in the forward and backward direction of the elongated hole 21d until the projection 31c is caught by the rear end portion of the elongated hole 21d, and the depth (length in the forward and backward direction) of the first storage part 31 can be secured long.

As depicted in FIG. 4, the glove box 1 has clip fixing portions 29 provided on the rear face side of an upper end portion of the upper panel part 22 and the front end portion 28a of the right panel part 28, and screw fixing portions 27 provided on the rear face side of the rear portion 21c and left side portion 21a of the frame body 21. The clip fixing portion 29 is a portion at which the glove box 1 is fixed by a clip to the instrument panel 7, and the screw fixing portion 27 is a portion at which the glove box 1 is fixed by a screw to the instrument panel 7.

By the clip fixing portions 29 and the screw fixing portions 27, the glove box 1 is fixed to the recess 7b of the instrument panel 7. In other words, the glove box 1 is provided as a separate member from the instrument panel 7 (provided as a module) and is attached to a lower portion of the instrument panel 7. It is to be noted that the clip fixing portions 29 are configured such that the glove box 1 is easily removed from the instrument panel 7 rather than the screw fixing portions 27.

A deck cross pipe 4 extending between left and right front pillars (not depicted) is provided on the front side of the instrument panel 7. The deck cross pipe 4 which is disposed at a front portion of the vehicle is a pipe member having high rigidity and extending substantially horizontally in the left and right direction (vehicle widthwise direction). Various parts such as the instrument panel 7, a steering apparatus (not depicted) and so forth are attached to the deck cross pipe 4.

[2. Knee Collision Protection Structure]

Now, the present knee collision protection structure is described. The present knee collision protection structure is provided at a portion of the instrument panel 7 opposed to the front passenger seat and suitably protects the knees in accordance with the physique of an occupant seated on the front passenger seat upon head-on collision of the vehicle. Since forward inertial force acts on the occupant in the compartment upon head-on collision of the vehicle, secondary collision wherein the occupant collides with the instrument panel 7, the seat back of the front seat or the like occurs. The present knee collision protection structure can reduce or absorb the knee load by such secondary collision of the occupant seated on the front passenger seat.

As depicted in FIGS. 1 to 3, a pair of left and right knee protectors 5 are connected in a spaced relationship from each other to portions of the deck cross pipe 4 opposed to the front passenger seat. It is to be noted that FIG. 3 is a sectional view wherein the present knee collision protection structure is cut along a space between the right side portion 21a of the frame body 21 and the right panel part 28. The knee protector 5 is a high-rigidity member having a function for receiving the knees of the occupant upon head-on collision of the vehicle to absorb the knee load and is referred to sometimes as knee absorber. As depicted in FIG. 3, the knee protector 5 is formed in a substantially L-like bent shape as viewed in side elevation. The knee protector 5 is fixed at one end portion 5a thereof to a face of the deck cross pipe 4 on the compartment side while the other end portion 5b of the knee protector 5 is provided on the rear side and on the lower side (on the compartment side) than the one end portion 5a such that the knee protector 5 has a cantilever supporting structure on the deck cross pipe 4.

The right side knee protector 5 is disposed in a space between the right side portion 21a of the glove box 1 and the right panel portion 28, and the left side knee protector 5 is disposed on the inner side (left side) in the vehicle widthwise direction than the left side portion 21a of the glove box 1. In other words, the pair of left and right knee protectors 5 are provided in a spaced relationship from each other by a distance longer than the length of the glove box 1 in the vehicle widthwise direction and are disposed at positioned at which they do not interfere with the glove box 1 in the forward and backward direction. Further, the knee protectors 5 are disposed on the upper side than the first storage part 31 of the glove box 1.

The other end portions 5b of the paired knee protectors 5 are connected to each other by a connection shaft (shaft member) 6. The connection shaft 6 is a bar-shaped member having high rigidity and extending substantially horizontally in the leftward and rightward direction on the compartment side of the deck cross pipe 4. Force applied to the connection shaft 6 is transmitted from the both end portions of the connection shaft 6 to the knee protector 5 and is absorbed by deformation of the knee protector 5 and transmitted to the deck cross pipe 4.

As depicted in FIGS. 2 to 4, the upper part 2 of the glove box 1 includes a second storage part 24 provided in an upwardly spaced relationship from the upper face of the storage lid part 23 and formed in bulge forward (rear face side) from the upper panel part 22. The second storage part 24 has a shape extending from the left side portion 21a to the right side portion 21a of the frame body 21 and bulging to the front side with respect to the rear portion 21c of the frame body 21 as viewed in side elevation such that it has a space in the inside thereof.

In short, the glove box 1 includes the two storage spaces of the first storage part 31 formed in the lower part 3 and the second storage part 24 formed in the upper part 2. The first storage part 31 has a great storage space and can store small articles such as a face cloth for performing simple maintenance of the vehicle by the occupant therein, an antifog spray and so forth. In the second storage part 24, since the length of the storage space thereof in the upward and downward direction is short, comparatively thin articles such as, for example, a vehicle inspection certificate, a road map and so forth can be stored.

In the second storage part 24, an end portion of a lower face portion (bottom face portion) on the compartment side is positioned on the front side than an end portion of the side portion 21a on the compartment side at the height of the lower face portion and is formed in a downwardly curved shape. The curve-shaped portion (hereinafter referred to as curved portion 25) continues to a rear end portion of the storage lid part 23. In other words, the end portion of the lower face portion of the second storage part 24 on the compartment side and the end portion of the storage lid part 23 on the compartment side are provided in an upwardly and downwardly juxtaposed relationship from each other sandwiching the curved portion 25 therebetween.

Consequently, a grooved portion 26 open on the front side of the vehicle and having a concave shape toward the compartment side is formed between the storage lid part 23 and the second storage part 24. The grooved portion 26 has a sideways directed U shape as viewed in side elevation and is formed from the left side portion 21a to the right side portion 21a of the frame body 21. The bottom of the grooved portion 26 corresponds to the curved portion 25 described above. The grooved portion 26 is positioned on the upper side than the first storage part 31 of the lower part 3 and is positioned on the lower side than the second storage part 24. In other words, the grooved portion 26 corresponds to a space between the first storage part 31 and the second storage part 24.

As depicted in FIG. 3, the connection shaft 6 extending in the vehicle widthwise direction is inserted in the grooved portion 26. The connection shaft 6 is disposed at a position at which it does not contact with any of the bottom (curved portion 25), two faces opposed to each other (upper face of the storage lid part 23 and the lower face of the second storage part 24) of the grooved portion 26. In other words, the connection shaft 6 is positioned on the front side than the upper panel portion 22 and the lower panel part 32 of the glove box 1 and on the rear side than the rear portion 21c of the frame body 21 and is positioned on the upper side than the first storage part 31 and on the lower side than the second storage part 24. It is to be noted that the connection shaft 6 is disposed on the upper side than the pivot shaft 20 of the glove box 1. That is, in the present knee collision protection structure, the connection shaft 6 disposed substantially in parallel to the pivot shaft 20 is provided on the upper side than the pivot shaft 20 independently of the pivot shaft 20 for opening and closing the storage space of the glove box 1.

Since the present knee collision protection structure is configured in such a manner as described above, if force acts in the forward direction on a lower portion of the lower panel part 32 than the connection shaft 6, for example, if the connection shaft 6 is brought into contact with the curved portion 25, then the glove box 1 rotates in a direction in which the lower end portion moves forward around the connection shaft 6. In other words, the connection shaft 6 in this case functions as a shaft member upon rotation of the glove box 1.

At this time, since the clip fixing portions 29 of the upper end portion of the glove box 1 are removed by the force acting on the lower panel part 32, the glove box 1 rotates as a whole. It is to be noted that, if the force acting in the forward direction increases until the rear face side of the glove box 1 is brought into contact with a different member (for example, the deck cross pipe 4) disposed on the front side than the instrument panel 7, then the rotation of the glove box 1 is stopped. In this case, the force is absorbed by crush of the storage space of the first storage part 31 of the glove box 1.

On the other hand, if force acts in the forward direction on an upper portion than the connection shaft 6 of the lower panel part 32 or a portion at the height equal to that of the connection shaft 6, then the glove box 1 does not rotate and the force is absorbed by crush of the storage space of the first storage part 31. In this case, the force from the front can be received and absorbed not only by the glove box 1 but also by the connection shaft 6 and the two knee protectors 5. Further, the force transmitted to the knee protectors 5 is transmitted to and absorbed by the deck cross pipe 4. In other words, the connection shaft 6 in this case functions as an absorption member for absorbing the force and also as a transmission member for transmitting the force.

[3. Action]

Figure 5A:
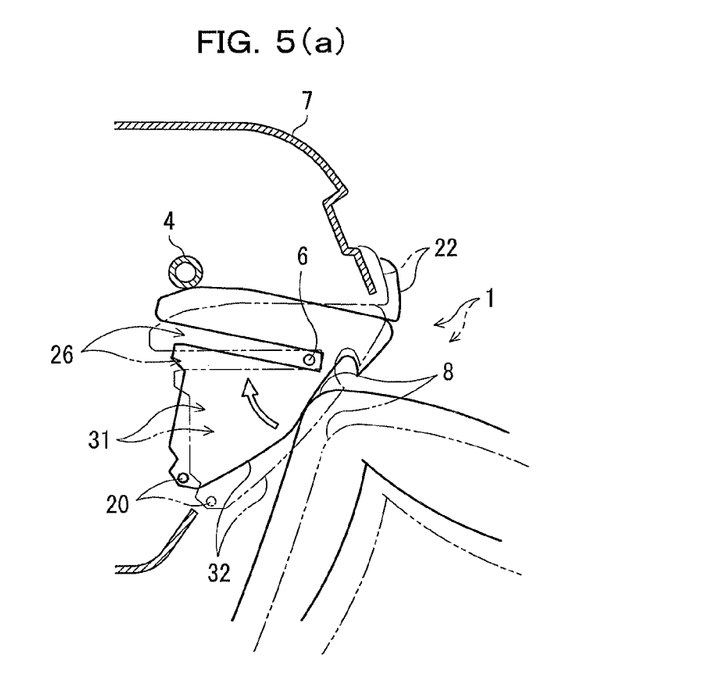
Figure 5B:
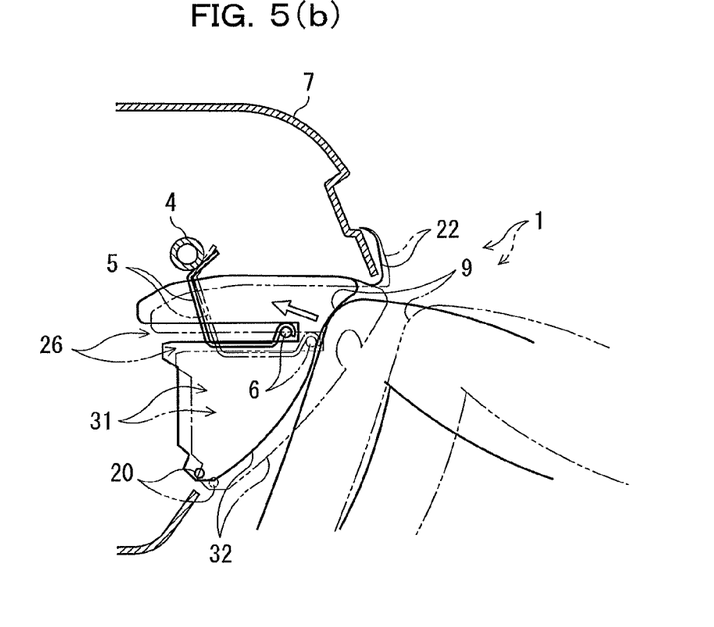

Now, an action of knee collision protection structure upon head-on collision of the vehicle is described with reference to FIGS. 5(a) and 5(b). FIG. 5(a) depicts an action in a case in which the physique of an occupant is small and FIG. 5(b) depicts an action in another case in which the physique of an occupant is great. In FIGS. 5(a) and 5(b), an alternate long and two short dashes line and a solid line indicate a state before collision and another state after collision, respectively.

First, an action in a case in which an occupant having a small physique is seated on the front passenger seat is described. As indicated by the alternate long and two short dashes line in FIG. 5(a), where then occupant has a small physique like a child or a woman, the position of a knee 8 is on the lower side than the connection shaft 6 and opposes to a lower portion of the lower panel part 32 of the glove box 1. If head-on collision of the vehicle occurs in this state, then the occupant secondarily collides with the instrument panel 7 or the glove box 1 by forward inertial force. At this time, the knee 8 of the occupant collides with a portion of the lower panel part 32 of the glove box 1 at the height (comparatively lower location) of the first storage part 31 as indicated by the solid line in FIG. 5(a). In short, the knee load by the secondary collision of the occupant acts on the lower portion of the lower panel part 32 than the connection shaft 6.

Consequently, since the glove box 1 rotates in a direction indicated by a white arrow mark around the connection shaft 6, the knee load by the secondary collision of the occupant is reduced. It is to be noted that, since the clip fixing portions 29 at the upper end portion of the glove box 1 come off from the instrument panel 7, the rotation of the glove box 1 is not disturbed. If the knee load increases further and the rear face side of the glove box 1 is brought into contact with a different member, then the rotation of the glove box 1 is stopped and the storage space of the first storage part 31 of the glove box 1 is crushed and then the lower panel part 32 is crushed forwardly, thereby the knee load is absorbed. It is to be noted that, by the crush of the glove box 1, forward movement of the knee 8 is suppressed. Further, when the knee load acts on the connection shaft 6, the knee load is absorbed by the knee protectors 5.

In other words, in the present knee collision protection structure, where the physique of the occupant is small, the knee load is reduced by rotation of the glove box 1 and the knee load is absorbed by crush of the glove box 1. Consequently, the knee 8 of the occupant is protected and forward movement of the occupant is suppressed.

Now, action in a case in which an occupant having a great physique is seated on the front passenger seat is described. As indicated by an alternate long and two dashes line in FIG. 5(*b*), if the occupant has a great physique like an adult male, the position of a knee 9 is on the upper side than the connection shaft 6 or at the height substantially equal to that of the connection shaft 6 and opposes to an upper portion of the lower panel part 32 of the glove box 1. If head-on collision of the vehicle occurs in such a state as just described, then the occupant secondarily collides with the instrument panel 7 or the glove box 1 by forward inertial force. At this time, the knee 9 of the occupant collides with a portion of the lower panel part 32 of the glove box 1 at the height (comparatively upper location) of the grooved portion 26 or the second storage part 24 as indicated by a solid line in FIG. 5(*b*).

In other words, the knee load by the secondary collision of the occupant acts on an upper portion of the lower panel part 32 than the connection shaft 6 or a portion of the lower panel part 32 at the height equal to that of the connection shaft 6. Therefore, as indicated by a white arrow mark in FIG. 5(*b*) in this case, the glove box 1 does not rotate and the storage space of the first storage part 31 is crushed, thereby the knee load is absorbed. Further, the knee load is received by the connection shaft 6 and transmitted from the both end portions of the connection shaft 6 to the knee protectors 5, thereby the knee load is absorbed by deformation of the knee protectors 5. Further, the knee load is transmitted to and absorbed by the deck cross pipe 4 through the knee protectors 5.

In short, in the knee collision protection structure, where the occupant has a great physique, the knee load is absorbed by crush of the glove box 1 and received by the connection shaft 6 and then absorbed by deformation of the knee protectors 5 and the deck cross pipe 4. Consequently, the knee 9 of the occupant is protected and the movement of the occupant is suppressed.

[4. Effects]

(1) Accordingly, with the present knee collision protection structure, upon head-on collision of the vehicle, the glove box 1 rotates around the connection shaft 6 when the knee load by secondary collision of the occupant acts on a lower portion of the lower panel part 32 than the connection shaft 6. Therefore, where the occupant has a small physique and the position of the knee 8 is low, the knee load can be reduced by rotation of the glove box 1. On the other hand, where the occupant has a great physique and the position of the knee 9 is high, the glove box 1 does not rotate and the storage space of the first storage part 31 is crushed, thereby the knee load can be absorbed. Consequently, upon head-on collision of the vehicle, the knees 8 and 9 of the occupants can be suitably protected in response to the physique of the occupant seated on the seat opposed to the glove box 1. In other words, upon head-on collision of the vehicle, the displacement amount of the knees 8 and 9 in the forward and backward direction can be reduced and the knees 8 and 9 of the occupants can be suitably protected irrespective of the physique of the occupants.

Further, with the present knee collision protection structure, also where the vehicle does not include a seatbelt pretensioner for suppressing the movement of the occupant, the forward movement of the occupant upon head-on collision of the vehicle can be suppressed by reception of the knee load by the lower panel part 32 of the glove box 1.

(2) The pair of knee protectors 5 are disposed on the upper side than the first storage part 31, and the connection shaft 6 for connecting the other end portions 5*b* of the paired knee protectors 5 to each other is provided on the front side than the lower panel part 32 of the glove box 1 and on the upper side than the first storage part 31. Therefore, if the knee 9 of the occupant having a great physique collides with the lower panel part 32, then the knee load of the occupant can be received by the connection shaft 6 and the knee protectors 5. Consequently, where the occupant has a great physique, the knee load that cannot be absorbed only by crush of the glove box 1 can be received and absorbed thereby to suitably protect the knee 9.

Further, since the connection shaft 6 not only has the functions as the absorption member and transmission member but also has the function as the shaft member upon rotation of the glove box 1, the number of parts can be decreased and increase of the space efficiency and reduction of the cost can be implemented.

(3) Since the glove box 1 is provided as a separate member from the instrument panel 7 and is fixed to the lower portion of the instrument panel 7, when the knee load by secondary collision of the occupant acts on a comparatively low portion of the glove box 1, the glove box 1 can easily rotate around the connection shaft 6. Consequently, where the occupant has a small physique, the knee load can be effectively reduced.

Further, since the glove box 1 in the present embodiment is fixed at the upper end portion thereof to the instrument panel 7 by the clip fixing portions 29, when the knee load acts on a comparatively low portion of the glove box 1, the upper end portion of the glove box 1 easily comes off from the instrument panel 7. Therefore, rotation of the glove box 1 when the knee load acts is not disturbed and the knee load of the occupant having a small physique can be effectively reduced.

Since the glove box 1 is configured by combining the upper part 2 and the lower part 3 with each other, the assembly performance when the glove box 1 and the connection shaft 6 are assembled to the instrument panel 7 can be enhanced. In particular, the instrument panel 7 is fixed to the deck cross pipe 4 in a state in which the two knee protectors 5 and the connection shaft 6 for connecting the two knee protectors 5 to each other are attached in advance to the deck cross pipe 4. Then, the upper part 2 is fixed to the instrument panel 7 in a state in which the connection shaft 6 is inserted in the grooved portion 26 of the upper part 2 of the glove box 1, and then the lower part 3 can be assembled to the upper part 2 finally.

Further, in the glove box 1, the first storage part 31 of the lower part 3 in a closed state is fitted with the frame body 21 of the upper part 2 and can be opened and closed by rotation of the lower part 3 with respect to the frame body 21. At this time, in the lower part 3, the projection 31*c* provided on the side face portion 31*a* of the first storage part 31 can be slidably moved in the forward and backward direction of the elongated hole 21*d* until it is caught by the rear end portion of the elongated hole 21*d* formed on the side portion 21*a* of the frame body 21. Consequently, the depth (length in the forward and backward direction) of the first storage part 31 can be secured by a great amount and the storage performance of the glove box 1 can be enhanced.

(5) Since the connection shaft 6 is inserted in the grooved portion 26 formed on the upper part 2 of the glove box 1, the rotation performance of the glove box 1 when the knee load acts can be enhanced without degrading the storage performance of the glove box 1.

Further, since, in the present embodiment, the second storage part 24 for forming the grooved portion 26 is provided, the storage performance of the glove box 1 can be enhanced further.

[5. Others]

While the embodiment of the present invention is described above, the present invention is not limited to the embodiment specifically described above, and variations and modifications can be made without departing from the scope of the present invention.

In the embodiment described above, the case is described in which the two knee protectors 5 connected to the deck cross pipe 4 and the connection shaft 6 for connecting the two knee protectors 5 to each other are provided and the connection shaft 6 has also the function as the shaft member upon rotation of the glove box 1. However, the shaft member for rotation of the glove box 1 may be provided independently of the connection shaft 6.

Further, in place of the configuration wherein the grooved portion 26 for inserting the shaft member therein is formed on the glove box 1, a structure may be applied wherein the glove box 1 and the shaft member are provided integrally with each other and the shaft member is fixed to the vehicle body through a bearing. That is, a structure may be applied wherein the glove box 1 rotates when the knee load of the occupant is applied to a lower portion of the glove box 1, and the structure is not limited to that of the shape of the embodiment described above.

The glove box 1 may not be provided as a separate member from (provided as a module with) the instrument panel 7, and, for example, a structure may be applied wherein the glove box 1 easily comes off from the instrument panel 7 and can rotate upon head-on collision of the vehicle. The glove box 1 may not be configured by combining the upper part 2 and the lower part 3.

Further, for example, a shape and a material of the glove box 1 may be contrived so that the knee load of an occupant having a great physique can be absorbed by the glove box 1. Consequently, the knee protector 5 or the connection shaft 6 can be omitted.

REFERENCE SIGNS LIST

1 glove box
2 upper part
  20 pivot shaft
  21 frame body
  22 upper panel part
  23 storage lid part
  24 second storage part
  26 grooved portion
3 lower part
  31 first storage part (storage part)
  32 lower panel part (panel part)
4 deck cross pipe
5 knee protector
6 connection shaft (shaft member)
7 instrument panel
8 knee of occupant having small physique
9 knee of occupant having great physique The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A knee collision protection structure for a vehicle, comprising:
  a glove box provided at a lower portion of an instrument panel and including a storage part and a panel part provided to stand on a cabin side of the storage part and configuring part of the instrument panel;
  a shaft member provided on the vehicle front side than the panel part of the glove box and on the upper side than the storage part and extending in a vehicle widthwise direction;
  a deck cross pipe provided on the vehicle front side than the instrument panel and extending in the vehicle widthwise direction; and
  a pair of left and right knee protectors disposed above the storage part and each having one end portion connected to the deck cross pipe and the other end portion provided on the vehicle rear side than the one end portion; wherein
  the glove box is provided so as to rotate around the shaft member when a knee of an occupant seated on a seat opposed to the glove box collides with a lower portion of the panel part than the shaft member.

2. The knee collision protection structure for a vehicle according to claim 1,
  wherein
  the shaft member is a connecting shaft that connects the other end portions of the pair of left and right knee protectors to each other.

3. The knee collision protection structure for a vehicle according to claim 2, wherein the glove box is provided as a separate member from the instrument panel and fixed to a lower portion of the instrument panel.

4. The knee collision protection structure for a vehicle according to claim 3, wherein the glove box is configured from a combination of a lower part including the storage part and the panel part and an upper part including a frame body in which the lower part is rotatably fitted.

5. The knee collision protection structure for a vehicle according to claim 4, wherein the upper part includes a grooved portion positioned on the upper side of the storage part in a state in which the upper part is combined with the lower part and formed in a concave shape toward the vehicle rear side; and
  the shaft member is inserted in the grooved portion.

6. The knee collision protection structure for a vehicle according to claim 2, wherein the glove box is configured from a combination of a lower part including the storage part and the panel part and an upper part including a frame body in which the lower part is rotatably fitted.

7. The knee collision protection structure for a vehicle according to claim 6, wherein the upper part includes a grooved portion positioned on the upper side of the storage part in a state in which the upper part is combined with the lower part and formed in a concave shape toward the vehicle rear side; and
  the shaft member is inserted in the grooved portion.

8. The knee collision protection structure for a vehicle according to claim 1, wherein the glove box is provided as a separate member from the instrument panel and fixed to a lower portion of the instrument panel.

9. The knee collision protection structure for a vehicle according to claim 8, wherein the glove box is configured from a combination of a lower part including the storage part and the panel part and an upper part including a frame body in which the lower part is rotatably fitted.

10. The knee collision protection structure for a vehicle according to claim 9, wherein the upper part includes a grooved portion positioned on the upper side of the storage part in a state in which the upper part is combined with the lower part and formed in a concave shape toward the vehicle rear side; and
  the shaft member is inserted in the grooved portion.

11. The knee collision protection structure for a vehicle according to claim 1, wherein the glove box is configured from a combination of a lower part including the storage part and the panel part and an upper part including a frame body in which the lower part is rotatably fitted.

12. The knee collision protection structure for a vehicle according to claim 11, wherein the upper part includes a grooved portion positioned on the upper side of the storage part in a state in which the upper part is combined with the lower part and formed in a concave shape toward the vehicle rear side; and the shaft member is inserted in the grooved portion.

* * * * *